United States Patent Office 2,838,547
Patented June 10, 1958

2,838,547

6α,21-DIFLUORO-16α-HYDROXY-STEROIDS

Barney J. Magerlein, William P. Schneider, Oldrich K. Sebek, and George B. Spero, Kalamazoo, Mich., assignors to The Upjohn Company, Kalamazoo, Mich., a corporation of Michigan No Drawing. Application February 19, 1958
Serial No. 716,015

19 Claims. (Cl. 260—397.45)

The present invention relates to steroid compounds and is more particularly concerned with 6α,21-difluoro-11β,16α,17α - trihydroxy - 4 - pregnene - 3,20 - dione, 6α,9α,21 - trifluoro - 11β,16α,17α-trihydroxy - 4 - pregnene-3,20-dione, 6α,21-difluoro-11β,16α,17α-trihydroxy-1,4-pregnadiene-3,20-dione, 6α,9α,21-trifluoro-11β,16α,17α-trihydroxy-1,4-pregnadiene-3,20-dione, the 16-esters thereof, the 11-keto analogues and the 16 esters thereof, and a method for the production thereof.

The novel compounds of this invention are illustratively represented by the following formula:

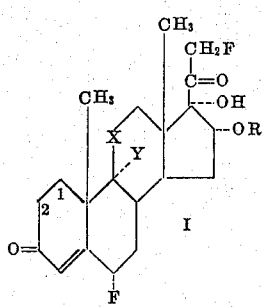

I wherein the 1,2-carbon atom linkage is selected from the linkages consisting of single bond linkages and double bond linkages, Y is selected from the group consisting of hydrogen and fluorine, X is selected from the group consisting of the carbonyl radical (>C=O) and the β-hydroxymethylene radical

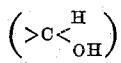

and R is selected from the group consisting of hydrogen and the acyl radical of an organic carboxylic acid, preferably a hydrocarbon carboxylic acid containing from one to twelve carbon atoms, inclusive.

The new compounds, 6α,21-difluoro-11β,16α,17α-trihydroxy-4-pregnene-3,20-dione, 6α,9α,21-trifluoro-11β,16α,17α-trihydroxy-4-pregnene-3,20-dione, 6α,21-difluoro-11β,16α,17α-trihydroxy-1,4-pregnadiene-3,20-dione, 6α,9α,21-trifluoro-11β,16α,17α-trihydroxy-1,4-pregnadiene-3,20-dione, their 16 esters and the 11-keto analogues and the esters thereof, are highly active adrenocortical hormones having greater glucocorticoid and anti-inflammatory activity than hydrocortisone or cortisone. In addition these compounds have diuretic activity and have salt-losing properties which make them especialy well suited in the management of chronic congestive heart failure and in the treatment of cirrhosis of the liver, the nephrotic and adrenogenital syndromes and the treatment of eclampsia and preeclampsia.

The novel 6α,21-difluoro-11β,16α,17α-trihydroxy-4-pregnene-3,20-dione, 6α,9α,21-trifluoro-11β,16α,17α-trihydroxy-4-pregnene-3,20-dione, 6α,21-difluoro-11β,16α,17α-trihydroxy-1,4-pregnadiene-30,20-dione, 6α,9α,21-trifluoro-11β,16α,17α-trihydroxy-1,4-pregnadiene-3,20-dione, the 16 esters thereof, the 11-keto analogues and the 16-esters thereof can be given in oral, parenteral or topical compositions. The compounds can be administered to the animal organism in conventional dosage forms such as pills, tablets and capsules for oral use or in conventional liquid forms as are used with natural and synthetic cortical steroid hormones for injection use. For topical use they can be administered in the form of ointments, creams, lotions and the like with or without co-acting antibiotics, germicides and the like.

The process of the present invention comprises microbiological hydroxylation of 6α,21-difluoro-11β,17α-dihydroxy-4-pregnene, 6α,9α,21-trifluoro-11β,17α-dihydroxy 4-pregnene-3,20-dione and the Δ¹-analogues thereof to produce the corresponding 16-hydroxy compounds. Esterification of the thus produced 16-hydroxylated compounds is productive of the 16-esters. The corresponding 11-keto analogues of these 16-hydroxylated compounds are obtained by oxidation of the 11-hydroxyl group of the above 16-esterified compounds with an oxidation agent such as chromic acid. If the free alcohols of the 11-keto compounds are desired, the additional step of hydrolyzing the 16-esters such as with an alkali metal base is necessary.

Starting materials for the present invention are 6α,21-difluoro - 11β,17α - dihydroxy-4-pregnene-3,20-dione, 6α,9α,21-trifluoro-11β,17α-dihydroxy-4-pregnene-3,20-dione, 6α,21-difluoro-11β,17α-dihydroxy-1,4-pregnadiene-3,20-dione, and 6α,9α,21-trifluoro-11β,17α-dihydroxy-1,4-pregnadiene-3,20-dione, prepared as shown in the preparations.

In the bioconversion step of the present invention, the operational conditions and reaction procedure and details may be those already known in the art of steroid bioconversion as illustrated by the Murray et al. U. S. Patent 2,602,769, issued July 8, 952, utilizing however the action of an organism of the genus Streptomyces. Among the species which are useful in the fermentation of steroids are Streptomyces roseochromogenus (Waksman Collection 3689), Streptomyces sp. (A. T. C. C. 11009), and Streptomyces roseochromogenus (A. T. C. C. 3347).

The selected species of actinomycete is grown on a medium suitably containing assimilable non-steroid carbon, illustratively carbohydrates, such as dextrose; assimilable nitrogen, illustratively soluble or insoluble proteins, peptones or amino acids; and mineral constituents, illustratively sodium or ammonium phosphate and magnesium sulfate. The medium may desirably have a pH before inoculation of between about 6.5 to about 7.8 though a higher or lower pH may be used. A pH of between about 6.8 and about 7.4 is preferred for the growth of actinomycetes and a temperature range from about 20 to about 35 degrees centigrade with about 20 to 32 degrees centigrade preferred.

The growth period required before the steroid to be fermented is exposed to the actinomycete does not appear to be critical, for example, the steroid may be added either before sterilization of the medium, at the time of inoculating the medium or at sometime later, for example, 24 or 48 hours later. The addition of steroid substrate to be fermented may be accomplished in any suitable manner, such as by dispersing the steroid substrate, either alone with a dispersing agent, or in solution in an organic solvent. Either submerged or surface culture procedures may be used with facility, although submerged culture is preferred.

The temperature during the period of fermentation of the steroid may be the same as that found suitable for the growth of the organism. It need be maintained only within such range as supports life, active growth, or the enzyme activity of the streptomycete.

The time required for the fermentation of the steroid varies somewhat with the procedure. When the steroid is added to the actinomycete after substantial growth of the organism, for example, after sixteen to 24 hours at optimum temperature, the conversion of steroid substrate begins immediately and is substantially complete in from two to ten days, five days being generally satisfactory.

After completion of the steroid fermentation, the resulting transformed steroid is recovered from the fermentation reaction mixture by extracting the fermentation reaction mixture, including the fermentation liquor and mycelium with an organic solvent for steroids, for example, methyl isopropyl ketone, methylene chloride, chloroform, carbon tetrachloride, ethylene chloride, trichloroethylene, ether, amyl acetate, benzene, and the like. The fermentation liquor and mycelium can be separated and then separately extracted with suitable solvents. The extracts can be combined, either before or after washing with an alkaline solution, illustratively sodium bicarbonate, suitably dried, as for example, over anhydrous sodium sulfate, and the resulting purified transformed steroid obtained by recrystallization from organic solvents, by trituration or by chromatography in order to isolate the thus obtained steroids from the other transformation products.

Bioconversion of $6\alpha,21$-difluoro-$11\beta,17\alpha$-dihydroxy-4-pregnene-3,20-dione, $6\alpha,9\alpha,21$-trifluoro-$11\beta,17\alpha$-dihydroxy-4-pregnene-3,20-dione, $6\alpha,21$-difluoro-$11\beta,17\alpha$-dihydroxy-1,4-pregnadiene-3,20-dione, and $6\alpha,9\alpha,21$-trifluoro-$11\beta,17\alpha$-dihydroxy-1,4-pregnadiene-3,20-dione according to the fermentation procedure above described, is productive of $6\alpha,21$-difluoro-$11\beta,16\alpha,17\alpha$-trihydroxy-4-pregnene-3,20-dione, $6\alpha,9\alpha,21$-trifluoro-$11\beta,16\alpha,17\alpha$-trihydroxy-4-pregnene-3,20-dione, $6\alpha,21$-difluoro-$11\beta,16\alpha,17\alpha$-trihydroxy-1,4-pregnadiene-3,20-dione, and $6\alpha,9\alpha,21$-trifluoro-$11\beta,16\alpha,17\alpha$-trihydroxy-1,4-pregnadiene-3,20-dione, repectively.

The 16-hydroxylated compounds thus produced can be esterified to produce the corresponding 16-esters. This reaction can be performed under esterification conditions known in the art, e. g., by the reaction of the hydroxy compound with the selected acid halide, e. g., acid chloride or acid bromide, the anhydride of a hydrocarbon carboxylic acid, or by reaction with the selected acid, in the presence of an esterification catalyst or with an ester under ester exchange reaction conditions. Reaction conditions which are apt to affect the labile $11\beta$-hydroxy group or 6-fluoro group should be avoided. Compounds thus produced include the 16-acyloxy compounds represented by Formula I wherein X is $\beta$-hydroxymethylene radical and wherein R is the acyl radical of an organic carboxylic acid, preferably a hydrocarbon carboxylic acid containing from one to twelve carbon atoms, inclusive, e. g., formic, propionic, butyric, isobutyric, valeric, isovaleric, trimethylacetic, 2-methylbutyric, 3-ethylbutyric, hexanoic, diethylacetic, triethylacetic, heptanoic, octanoic, $\alpha$-ethylisovaleric, succinic, a cyclic acid, e. g., cyclopropylideneacetic, cyclopentylformic, cyclopentylacetic, $\beta$-cyclohexylpropionic, cyclohexylformic, cyclohexylacetic, an aryl or alkaryl acid, e. g., benzoic, 2-, 3- or 4-methylbenzoic, 2,3-, 2,4-, 2,5-, 2,6-, 3,4- and 3,5-dimethylbenzoic, ethylbenzoic, 2,4,6-trimethylbenzoic, 2,4,6-triethylbenzoic, $\alpha$-naphthoic, 3-methyl-$\alpha$-naphthoic, an aralkyl acid, e. g., phenylacetic, phenylpropionic, diphenylacetic, triphenylacetic, an unsaturated acid, e. g., acrylic, maleic, vinyl acetic, propiolic, undecolic, etc. Illustrative of the esters thus produced are the 16-acylates such as $6\alpha,21$-difluoro-$11\beta,16\alpha,17\alpha$-trihydroxy-4-pregnene-3,20-dione 16-acetate, $6\alpha,21$-difluoro-$11\beta,16\alpha,17\alpha$-trihydroxy-1,4-pregnadiene-3,20-dione 16-acetate, $6\alpha,9\alpha,21$-trifluoro-$11\beta,16\alpha$,$17\alpha$-trihydroxy-4-pregnene-3,20-dione 16-acetate, $6\alpha,9\alpha$,$21$-trifluoro-$11\beta,16\alpha,17\alpha$-trihydroxy-1,4-pregnadiene-3,20-dione 16-acetate, and the like.

The $11\beta$-hydroxyl of the thus produced 16-acylate compounds can be oxidized to the corresponding 11-ketone with an oxidizing agent. Oxidizing agents such as chromic acid, potassium dichromate, a halo-amide, and the like are operative. The oxidation can be carried out by a variety of methods, such as, for example, by oxidizing the said $11\beta$-hydroxy steroid in acetic acid-water solution with chromium trioxide, using molar quantities or a slight excess, such as from ten to thirty percent excess, or by oxidizing with a haloamide or imide of an acid, such as N-bromoacetamide, N-chlorosuccinimide, or N-bromosuccinimide dissolved in pyridine, dioxane, or other suitable solvents. At the conclusion of the desired oxidation reaction, the excess oxidant is generally destroyed by addition of methyl alcohol, ethyl alcohol, and the like for the chromic acid oxidant or a bisulfite for N-bromoacetamide, N-bromosuccinimide and other N-haloacylamides and imides. Thereafter, the resulting 11-keto product is recovered by conventional means, such as by dilution with water and extraction with a water-immiscible solvent, e. g., methylene chloride, ether, benzene, toluene, ethyl acetate, or the like. Illustrative of the 11-keto 16-acylates thus produced are, for example, $6\alpha,21$-difluoro-$16\alpha,17\alpha$-dihydroxy-4-pregnene-3,11,20-trione 16-acetate, $6\alpha,9\alpha,21$-trifluoro-$16\alpha,17\alpha$-dihydroxy-4-pregnene-3,11,20-trione 16-acetate, $6\alpha,21$-difluoro-$16\alpha,17\alpha$-dihydroxy-1,4-pregnadiene-3,11,20-trione 16-acetate, $6\alpha,9\alpha,21$-trifluoro-$16\alpha,17\alpha$-dihydroxy-1,4-pregnadiene-3,11,20-trione 16-acetate, and the like.

The 11-keto 16-acylates thus produced may, if desired, be converted to the free alcohols, i. e., $6\alpha,21$-difluoro-$16\alpha,17\alpha$-dihydroxy-4-pregnen-3,11,20-trione, $6\alpha,9\alpha,21$-trifluoro-$16\alpha,17\alpha$-dihydroxy-4-pregnene-3,11,20-trione, $6\alpha$, $21$-difluoro-$16\alpha,17\alpha$-dihydroxy-1,4-pregnadiene-3,11,20-trione, and $6\alpha,9\alpha,21$-trifluoro-$16\alpha,17\alpha$-dihydroxy-1,4-pregnadiene-3,11,20-trione. The alcohols are obtained from the acylates by hydrolysis in accordance with general hydrolysis procedures known in the art. A preferred procedure is to employ at least a molar equivalent of an alkali-metal bicarbonate in a substantially oxygen-free solution of a mixture of a lower alkanol and water. The hydrolysis reaction is carried out at a temperature between ten and thirty degrees centigrade while protecting the mixture from atmospheric oxygen. After the hydrolysis is complete, the reaction mixture is neutralized with an acid, e. g., acetic acid, and the hydrolyzed product recovered from the reaction mixture by evaporation and crystallization, extraction with methylene chloride, or the like. The 16-esters when desired, can again be prepared by esterification of the hydroxyls by esterification procedures hereinbefore described. The preferred esters are those derived from an organic carboxylic acid, preferably a hydrocarbon carboxylic acid containing from one to twelve carbon atoms, inclusive.

The following preparations and examples are illustrative of the process and products of the present invention but are not to be construed as limiting.

PREPARATION 1

*The 3-ethylene ketal of methyl 3,11-diketo-5α,6α-oxido-17(20)-[cis]-pregnen-21-oate*

To a solution of 5.0 grams of the 3-ethylene ketal of methyl 3,11-diketo-4,17(20)-[cis]-pregnadien-21-oate, prepared in the manner described in U. S. Patent 2,707,-184, in 100 milliliters of chloroform was added a chilled solution of 1.9 grams of perbenzoic acid dissolved in 31.5 milliliters of chloroform. The solution was maintained at about four degrees centigrade for 24 hours, and then at room temperature for 72 hours. The solution was then washed with a five percent aqueous solution of sodium bicarbonate and then with water. The chloroform layer was separated, dried and the solvent distilled to give a residue of 5.3 grams of solid. Crystallization of this solid from methanol gave 2.24 grams of product melting at 180 to 195 degrees centigrade and after two crystallizations from methanol, there was obtained pure 3-ethylene ketal of methyl 3,11-diketo,5α,6α-oxido-17 (20)-[cis]-pregnen-21-oate melting at 206 to 209 degrees centigrade having an $[\alpha]_D$ of plus 37 degrees $(CHCl_3)$ and having the analysis given below:

*Analysis.*—Calculated for $C_{24}H_{32}O_6$: C, 69.20; H, 7.75. Found: C, 69.59; H, 7.81.

PREPARATION 2

*Methyl 3,11-diketo-5α-hydroxy-6β-fluoro-17(20)-allopregnen-21-oate*

To a solution of 1.73 grams of 3-ethylene ketal of methyl 3,11-diketo-5α,6α-oxido-17(20)-[cis]-pregnen-21-oate in sixteen milliliters of methylene chloride was added six milliliters of 48 percent hydrofluoric acid. The heterogeneous mixture was stirred for two hours, made slightly basic with 300 milliliters of five percent sodium bicarbonate solution, and extracted with methylene chloride. The extract was washed, dried and evaporated to dryness to give 1.62 grams of crude solid. Chromatography gave two fractions: A, 481 milligrams eluted with methylene chloride plus five percent acetone and B, 921 milligrams eluted with methylene chloride plus ten and twenty percent acetone. Crystallization of fraction A from acetone-Skellysolve B hexanes gave 390 milligrams of methyl 3,11-diketo-5α-hydroxy-6β-fluoro-17(20)-allopregnen-21-oate, melting point 254 to 260 degrees centigrade. An analytical sample melted at 260 to 263 degrees centigrade.

*Analysis.*—Calculated for $C_{22}H_{29}O_5F$: F, 4.84. Found: F, 4.47.

PREPARATION 3

*Methyl 3,11-diketo-5α-hydroxy-6β-fluoro-17(20)-allopregnen-21-oate 3-ethylene ketal*

A mixture of 1.9 grams of methyl 3,11-diketo-5α-hydroxy-6β-fluoro-17(20)-allopregnen-21-oate, 59 milligrams of p-toluenesulfonic acid monohydrate and 31 milliliters of distilled ethylene glycol was added to 800 milliliters of benzene. The mixture was stirred and refluxed for two hours, with the condensate passing through a water trap to remove the water. After reflux the mixture was cooled, washed with water and evaporated to dryness to give a crude solid which on recrystallization from acetone-Skellysolve B hexanes give 1.96 grams of methyl 3,11-diketo-5α-hydroxy-6β-fluoro-17(20)-allopregnen-21-oate 3-ethylene ketal, melting point 170 to 173 degrees centigrade.

PREPARATION 4

*5α,11β,21-trihydroxy-6β-fluoro-17(20)-allopregnen-3-one 3-ethylene ketal*

To a solution of 1.96 grams of methyl 3,11-diketo-5α-hydroxy-6β-fluoro-17(20)-allopregnen-21-oate 3-ethylene ketal in 850 milliliters of anhydrous ether was added 3.7 grams of lithium aluminum hydride and the mixture was stirred for a period of one hour. 200 milliliters of water was added slowly and the ether phase separated. The aqueous phase was extracted with ethyl acetate and the extracts added to the ether phase. The combined ether-ethyl acetate solution was washed with water, dried and evaporated to dryness under reduced pressure. The crude solid residue was crystallized from acetone-Skellysolve B hexanes to give 1.30 grams of 5α,11β,21-trihydroxy-6β-fluoro-17(20)-allopregnen-3-one 3-ethylene ketal, melting point 197 to 205 degrees centigrade. An additional 226 milligrams was obtained from the mother liquor, melting point 175 to 185 degrees centigrade.

PREPARATION 5

*5α,11β-dihydroxy-6β-fluoro-21-acetoxy-17(20)-allopregnen-3-one 3-ethylene ketal*

The acetate was prepared by allowing 0.87 gram of 5α,11β,21-trihydroxy-6β-fluoro-17(20)-allopregnen-3-one 3-ethylene ketal to stand overnight in ten milliliters of acetic anhydride and ten milliliters of pyridine. The solution was then poured into ice water to give 0.92 gram of 5α,11β-dihydroxy-6β-fluoro-21-acetoxy-17(20)-allopregnen-3-one 3-ethylene ketal, melting point 140 to 150 degrees centigrade, which on recrystallization from acetone-Skellysolve B hexanes gave 0.77 gram, melting point 149 to 153 degrees centigrade.

PREPARATION 6

*5α,11β,17α - trihydroxy-6β-fluoro-21-acetoxyallopregnane-3,20-dione 3-ethylene ketal*

To a solution of 0.77 gram of 5α,11β-dihydroxy-6β-fluoro - 21 - acetoxy-17(20)-allopregnen-3-one 3-ethylene ketal in 35 milliliters of tertiary butyl alcohol was added one milliliter of pyridine, 1.9 milliliters of 1.95 molar tetiary butyl alcohol solution of N-methylmorpholine oxide peroxide, and 13.1 milligrams of osmium tetroxide (9.1 milliliters of tertiary butyl alcohol solution containing 1.44 milligrams $OsO_4$ per milliliter). The solution was stirred for a period of 2.5 hours, fifteen milliliters of five percent sodium hydrosulfate added, stirred for an additional ten minutes, 0.7 gram of finely ground synthetic magnesium silicate added, stirred for a period of twenty minutes more and filtered. The filtrate was taken to dryness under reduced pressure (below fifty degrees centigrade) and the residue dissolved in methylene chloride, washed with water, dried and evaporated to dryness. This residue was crystallized from acetone-Skellysolve B hexanes to give 0.47 gram of 5α,-11β,17α-trihydroxy-6β-fluoro - 21 - acetoxyallopregnane-3,20-dione 3-ethylene ketal, melting point 220 to 228 degrees centigrade.

PREPARATION 7

*5α,11β,17α-trihydroxy - 6β-fluoro-21-acetoxyallopregnane-3,20-dione*

A solution of 0.47 gram of 5α,11β,17α-trihydroxy-6β-fluoro-21-acetoxyallopregnane - 3,20 - dione 3-ethylene ketal in 35 milliliters of acetone and four milliliters of one normal sulfuric acid solution was gently boiled on the steam bath for ten minutes, cooled and neutralized with dilute sodium bicarbonate solution. Addition of water and cooling gave 0.33 gram of 5α,11β,17α-trihydroxy-6β-fluoro - 21 - acetoxyallopregnane - 3,20 - dione, melting point 230 to 240 degrees centigrade.

PREPARATION 8

*6β-fluoro-11β,17α-dihydroxy-21-acetoxy-4-pregnene-3,20-dione (6β-fluorohydrocortisone acetate)*

A solution of 100 milligrams of 5α,11β,17α-trihydroxy-6β-fluoro-21-acetoxyallopregnane - 3,20 - dione in 4.9 milliliters of acetic acid and 0.1 milliliter of water was refluxed for a period of one hour, cooled, diluted with fifty milliliters of water and evaporated to dryness under reduced pressure. The residue was chromatographed over Florisil (synthetic magnesium silicate) to give one fraction (77 milligrams) eluted with methylene chloride plus ten percent acetone. Crystallization from acetone-Skellysolve B hexanes gave 38 milligrams of 6β-fluoro-11β,17α-dihydroxy-21-acetoxy-4-pregnene - 3,20 - dione (6β-fluorohydrocortisone acetate), melting point 210 to 218 degrees centigrade. Infrared data and ultraviolet data were found to be in agreement with the structure.

PREPARATION 9

*Isomerization of 6β- to 6α-fluorohydrocortisone acetate*

A solution of 0.132 gram of 6β-fluorohydrocortisone acetate in twelve milliliters of chloroform and 0.1 milliliter of absolute alcohol was cooled to minus ten degrees centigrade in an ice-salt bath and a stream of anhydrous hydrochloric acid was gently bubbled through the solution for 2.5 hours while the temperature was maintained between minus five and minus fifteen degrees centigrade. The solution was then diluted with 25 milliliters of chloroform, washed with dilute sodium bicarbonate and water, dried over anhydrous sodium sulfate, and evaporated to dryness under reduced pressure at sixty degrees centigrade or less. Crystallization of the residue from acetone-Skellysolve B gave 42 milligrams of product, 6α-fluorohydrocortisone acetate, melting point 203 to 210 degrees centigrade.

PREPARATION 10

*6α-fluoro-11β,17α,21-trihydroxy-4-pregnene-3,20-dione (6α-fluorohydrocortisone)*

A solution of 1.1 grams of 6α-fluorohydrocortisone acetate, 1.0 gram of potassium bicarbonate, 100 milliliters of methanol and fifteen milliliters of water was purged with nitrogen and stirred at 25 degrees centigrade for four hours. The solution was then neutralized by addition of acetic acid and the methanol was removed by distillation under reduced pressure. The residue was extracted with 100 milliliters of methylene dichloride and the extract, after drying over sodium sulfate, was chromatographed over a column of eighty grams of synthetic magnesium silicate. The product fraction was eluted with Skellysolve B hexanes plus twenty and thirty percent acetone and gave 770 milligrams of 6α-fluorohydrocortisone which melted at 192 to 195 degrees centigrade after crystallization from ethyl acetate-Skellysolve B hexanes. An analytical sample melted at 192 to 201 degrees centigrade and had a rotation of [α]$_D$ plus 127 degrees (chloroform).

*Analysis.*—Calculated for $C_{21}H_{29}O_5F$: C, 66.29; H, 7.68; F, 4.99. Found: C, 66.28; H, 7.65; F, 4.43.

PREPARATION 11

*1-dehydro-6α-fluorohydrocortisone*

Five 100-milliliter portions of a medium in 250-milliliter Erlenmeyer flasks, containing one percent glucose, two percent corn steep liquor (sixty percent solids) and tap water, were adjusted to a pH of 4.9. This medium was sterilized for 45 minutes at fifteen pounds per square inch pressure and inoculated with a one to two day growth of *Septomyxa affinis*, A. T. C. C. 6737. The Erlenmeyer flask was shaken at room temperature (about 26 to 28 degrees centigrade) for a period of three days. At the end of this period this 500-milliliter volume was used as an inoculum for ten liters of the same glucose-corn steep liquor medium which, in addition, contained ten milliliters of an antifoam compound (a mixture of lard oil and octadecanol). The fermentor was placed into the water-bath, adjusted to 28 degrees centigrade and the contents stirred (300 R. P. M.) and aerated (0.3 liter air per minute to five liters of beer). After 24 hours of incubation, when a good growth had been developed, five grams of 6α-fluorohydrocortisone acetate plus one-half gram of 3-ketobisnor-4-cholen-22-al, dissolved in 25 milliliters of dimethylformamide was added and the incubation carried out at the same temperature (28 degrees centigrade) and aeration for a period of 72 hours (final pH 8.3). The mycelium was filtered off and washed with water. The wash water was combined with the filtrate and the whole was extracted with three two-liter portions of a mixture of methylene chloride ethyl acetate (3:1). Removal of the solvent by evaporation gave 5.25 grams of crude solid which was triturated twice with four milliliters of methylene chloride to give 2.4 grams of 1-dehydro-6α-fluorohydrocortisone of melting point 198 to 203 degrees centigrade. An analytical sample, recrystallized from acetone, melted at 202 to 204 degrees centigrade. Analysis gave [α]$_D$ plus 73 degrees (dioxane) and the following:

*Analysis.*—Calculated for $C_{21}H_{27}O_5F$: C, 66.65; H, 7.10; F, 5.02. Found: C, 66.69; H, 7.19; F, 5.49.

PREPARATION 12

*6α - fluoro - 17α,21 - dihydroxy - 4,9(11) - pregnadiene-3,20-dione 21-acetate*

To a solution of one gram of 6α-fluorohydrocortisone acetate in ten milliliters of pyridine was added 0.4 gram of N-bromoacetamide. The mixture was allowed to stand under nitrogen for twenty minutes, at which time it was cooled to five degrees centigrade. While stirring, anhydrous sulfur dioxide was passed over the surface until the solution gave no color change with acidified starch-iodide paper. The temperature of the reaction mixture was not allowed to go above twenty degrees centigrade during the sulfur dioxide addition. The mixture was then allowed to stand for five minutes and was poured into 100 milliliters of ice-water, resulting in precipitation of 915 milligrams of crude solid, melting point 190 to 202 degrees centigrade. Crystallization from acetone gave 511 milligrams of 6α-fluoro-17α,21-dihydroxy-4,9(11)-pregnadiene-3,20-dione 21-acetate, melting point 214 to 218 degrees centigrade. An analytical sample melted at 220 to 227 degrees centigrade. Analysis gave [α]$_D$ plus 73 degrees (acetone) and the following:

*Analysis.*—Calculated for $C_{23}H_{29}O_5$: C, 68.30; H, 7.23; F, 4.70. Found: C, 68.77; H, 7.57; F, 4.77.

PREPARATION 13

*6α - fluoro - 9α - bromo - 11β,17α,21 - trihydroxy - 4-pregnene - 3,20 - dione 21 - acetate (6α - fluoro - 9α-bromo-hydrocortisone acetate)*

To a solution of 420 milligrams of 6α-fluoro-17α,21-dihydroxy-4,9(11)-pregnadiene-3,20-dione 21-acetate in 6.5 milliliters of methylene chloride was added 12.5 milliliters of tertiary butyl alcohol, a solution of 1.0 milliliter of 72 percent perchloric acid in 75 milliliters of water, and a solution of 182 milligrams of N-bromoacetamide in 3.2 milliliters of tertiary butyl alcohol. After stirring for fifteen minutes, a solution of 182 milligrams of sodium sulfite in ten milliliters of water was added and the mixture concentrated under reduced pressure at sixty degree centigrade until crystallization occurred. After cooling in an ice bath, thirty milliliters of water was added with stirring. The crystalline product was filtered, washed with water and dried, giving a yield of 480 milligrams of essentially pure 6α-fluoro-9α-bromo-11β,17α,21-trihydroxy-4-pregnene-3,20-dione 21-acetate, melting point 163 to 166 degree centigrade (with decomposition). The product can be used in the succeeding example without further purification.

PREPARATION 14

*6α - fluoro - 9β,11β - oxido - 17α,21 - dihydroxy - 4-pregnene-3,20-dione 21-acetate*

A mixture of 2.816 grams of 6α-fluoro-9α-bromo-11β, 17α,21 - trihydroxy - 4 - pregnene - 3,20 - dione 21 - acetate (6α-fluoro-9α-bromohydrocortisone acetate), 2.816 grams of potassium acetate, and ninety milliliters of acetone was stirred and heated at reflux temperature for eighteen hours. The reaction mixture was then concentrated to about one-half of the original volume and cooled in an ice-bath. Addition of 250 milliliters of water gave 2.264 grams of 6α-fluoro-9β,11β-oxido-17α,21-dihydroxy-4-pregnene-3,20-dione 21-acetate, melting point 195 to 200 degrees centigrade with decomposition. The analytical sample, recrystallized from acetone, melted at 197 to 200 degrees centigrade. Analysis gave [α]$_D$ plus 28 degrees (acetone) and the following:

*Analysis.*—Calculated for $C_{23}H_{29}O_6F$: C, 65.70; H, 6.95; F, 4.52. Found: C, 65.76; H, 7.03; F, 4.24.

PREPARATION 15

*6α,9α - difluoro - 11β,17α,21 - trihydroxy - 4 - pregnene-3,20-dione 21-acetate (6α,9α-difluorohydrocortisone acetate)*

To 3.41 grams of liquid hydrogen fluoride cooled in a Dry-Ice bath was added, portion-wise, a slurry of 1.875 grams of 6α-fluoro-9β,11β-oxido-17α,21-dihydroxy - 4- pregnene-3,20-dione 21-acetate in 5.97 grams of tetrahydrofuran (distilled over sodium hydroxide) and twenty milliliters of methylene chloride which had similarly been cooled in a Dry-Ice bath. The steroid dissolved completely. After standing at zero to five degrees centigrade for seventeen hours, the reaction mixture was poured slowly into a stirred mixture of 300 milliliters ice-water, fifty milliliters of methylene chloride, and twenty grams of sodium bicarbonate. The mixture was stirred for a few minutes, the methylene chloride layer was separated and the water phase extracted with two fifty-milliliter portions of fresh methylene chloride. The combined methylene chloride solutions were washed with water and dried. Attempts to crystallize the product by addition of Skellysolve B hexanes gave only oil. The oil was again dissolved by addition of methylene chloride and chromatographed over synthetic magnesium silicate. One long fraction of 1.496 grams of crystalline product came down from the column, which, according to papergram analysis, was a mixture of several components.

The whole column fraction was acetylated overnight with ten milliliters of acetic anhydride in ten milliliters of pyridine. The acetylation mixture was poured into ice-water and extracted with methylene chloride. The extract was washed with dilute acid, dilute base, water, dried and put over a synthetic magnesium silicate column. The fraction (1.075 grams) eluted from the column with fifteen and twenty percent acetone in Skellysolve B hexanes, was recrystallized several times and gave 180 milligrams of constant melting product, 6α,9α-difluorohydrocortisone acetate, melting point 220 to 225 degrees centigrade. Analysis gave [α]$_D$ plus 115 degrees (acetone) and the following:

Analysis.—Calculated for $C_{23}H_{30}O_6F_2$: C, 62.71; H, 6.87; F, 8.63. Found: C, 62.85; H, 7.22; F, 8.67.

PREPARATION 16

6α,9α-difluoro-11β,17α,21-trihydroxy-4-pregnene-3,20-dione (6α,9α-difluorohydrocortisone)

Nitrogen was bubbled through a solution of 0.33 gram of 6α,9α-difluoro-11β,17α,21-trihydroxy-4-pregnene-3,20-dione 21-acetate (6α,9α-difluorohydrocortisone acetate) in 33 milliliters of methanol for fifteen minutes. To this was added a solution of 0.33 gram of potassium bicarbonate in four milliliters of water, likewise treated with nitrogen. After stirring under nitrogen for four hours, the base was neutralized by the addition of 2.5 milliliters of five percent hydrochloric acid. The mixture was then concentrated under reduced pressure at fifty degrees centigrade to about five milliliters. The residue was taken up in ethyl acetate, washed with water, dried and evaporated to dryness. Crystallization of the residue from acetone-Skellysolve B hexanes yielded 0.27 gram of 6α,9α-difluoro-11β,17α,21-trihydroxy-4-pregnene-3,20-dione (6α,9α-difluorohydrocortisone), melting point 210 to 218 degrees centigrade. An analytical sample melted at 214 to 217 degrees centigrade. Analysis gave [α]$_D$ plus 115 degrees (acetone) and the following:

Analysis.—Calculated for $C_{21}H_{28}O_5F_2$: C, 63.30; H, 7.08; F, 9.54. Found: C, 63.60; H, 7.39; F, 8.48.

PREPARATION 17

6α-fluoro-11β,17α-dihydroxy-21-acetoxy-1,4-pregnadiene-3,20-dione (1-dehydro-6α-fluorohydrocortisone acetate)

A solution of two grams of 1-dehydro-6α-fluorohydrocortisone in ten milliliters of pyridine and ten milliliters of acetic anhydride was allowed to stand at room temperature for seventeen hours, and was then poured into a mixture of ice and water. The resulting crystalline product was isolated by filtration, washed with water and dried. The yield of 1-dehydro-6α-fluorohydrocortisone acetate was 1.32 grams of melting point 232 to 237 degrees centigrade. An analytical sample melted at 238 to 242 degrees centigrade. Analysis gave [α]$_D$ plus 102 degrees (acetone) and the following:

Analysis.—Calculated for $C_{23}H_{29}O_6F$: C, 65.70; H, 6.95; F, 4.52. Found: C, 65.58; H, 7.16; F, 4.39.

PREPARATION 18

6α-fluoro-17α-hydroxy-21-acetoxy-1,4,9(11)-pregnatriene-3,20-dione

To a solution of 1.05 grams of 1-dehydro-6α-fluorohydrocortisone acetate in ten milliliters of pyridine was added 0.517 gram of N-bromoacetamide. The mixture was allowed to stand under nitrogen for fifteen minutes, at which time it was cooled to five degrees centigrade. While stirring, sulfur dioxide was passed over the surface until the solution gave no color change with acidified starch-iodide paper. The temperature of the reaction mixture was not allowed to go above twenty degrees centigrade during the sulfur dioxide addition. The mixture was then poured into 100 milliliters of ice-water, resulting in precipitation of 977 milligrams of 6α-fluoro-17α-hydroxy-21-acetoxy-1,4,9(11)-pregnatriene-3,20-dione, melting point 186 to 196 degrees centigrade (with decomposition). An analytical sample melted at 213 to 216 degrees centigrade (with decomposition). Analysis gave [α]$_D$ plus 34 degrees (acetone) and the following:

Analysis.—Calculated for $C_{23}H_{27}O_5F$: C, 68.64; H, 6.76; F, 4.72. Found: C, 68.85; H, 6.86; F, 4.72.

PREPARATION 19

6α-fluoro-9α-bromo-11β,17α-dihydroxy-21-acetoxy-1,4-pregnadiene-3,20-dione (1-dehydro-6α-fluoro-9α-bromohydrocortisone acetate)

To a solution of 1.27 grams of 6α-fluoro-17α-hydroxy-21-acetoxy-1,4,9(11)-pregnatriene-3,20-dione in 19.5 milliliters of methylene chloride was added 38 milliliters of tertiary butyl alcohol, a solution of three milliliters of 72 percent perchloric acid in 22.5 milliliters of water, and a solution of 0.55 gram of N-bromoacetamide in 9.6 milliliters of tertiary butyl alcohol. After stirring for fifteen minutes, a solution of 0.55 gram of sodium sulfite in thirty milliliters of water was added and the mixture concentrated under reduced pressure at sixty degrees centigrade until crystallization occurred. After cooling in an ice bath, 100 milliliters of water was added with stirring. On filtering the crystalline product, followed by washing with water and drying, a yield of 1.59 grams of essentially pure 6α-fluoro-9α-bromo-11β,17α-dihydroxy-21-acetoxy-1,4-pregnadiene-3,20-dione, melting point 188 to 191 degrees centigrade (with decomposition) was obtained. The product can be used in the succeeding example without further purification.

PREPARATION 20

6α-fluoro-9β,11β-oxido-17α-hydroxy-21-acetoxy-1,4-pregnadiene-3,20-dione

A mixture of 1.749 grams of 6α-fluoro-9α-bromo-11β,17α-dihydroxy-21-acetoxy-1,4-pregnadiene-3,20-dione (1-dehydro-6α-fluoro-9α-bromohydrocortisone acetate) 1.749 grams of potassium acetate, and fifty milliliters of acetone was stirred and heated at reflux temperature for eighteen hours. The reaction mixture was then concentrated to about one-half the original volume cooled and poured into 300 milliliters of water to give 1.303 grams of 6α-fluoro-9β,11β-oxido-17α-hydroxy-21-acetoxy-1,4-pregnadiene-3,20-dione, melting point 234 to 238 degrees centigrade (with decomposition). An analtical sample, recrystallized from acetone, melted at 257 to 260 degrees centigrade. Analysis gave [α]$_D$ plus seventy degrees (acetone) and the following:

Analysis.—Calculated for $C_{23}H_{27}O_6F$: C, 66.01; H, 6.50; F, 4.54. Found: C, 65.73; H, 6.58; F, 3.87.

PREPARATION 21

6α,9α - difluoro - 11β,17α - dihydroxy - 21 - acetoxy - 1,4-pregnadiene - 3,20 - dione (1 - dehydro- 6α,9α - difluorohydrocortisone acetate)

To 5.2 grams of liquid hydrogen fluoride cooled in a Dry-Ice bath, was added, portion-wise, a slurry of 2.276 grams of 6α-fluoro-9β,11β-oxido-17α-hydroxy-21-acetoxy-1,4-pregnadiene-3,20-dione in nine grams of tetrahydrofuran (distilled over NaOH) and 28 milliliters of methylene chloride which had similarly been cooled in a Dry-Ice bath. The steroid dissolved completely. After standing at zero to five degrees centigrade for seventeen hours, the reaction mixture was poured slowly into a stirred mixture of 500 milliliters of water and 25 grams of sodium bicarbonate. The mixture was stirred for a few minutes, and the product was extracted with three 100-milliliter portions of methylene chloride. The methylene chloride solutions were washed with water, dried, and chromatographed over synthetic magnesium silicate. The fraction eluted from the column with fifteen and twenty percent acetone in Skellysolve B hexanes was recrystallized from ethyl acetate-Skellysolve B hexanes and gave 1.342 grams of 1-dehydro-6α,9α-difluorohydrocortisone acetate, melting point 238 to 242 degrees centigrade. An analytical sample melted at 239 to 242 degrees centigrade. Analysis gave $[\alpha]_D$ plus 91 degrees (acetone) and the following:

Analysis.—Calculated for $C_{23}H_{28}O_6F_2$: C, 63.00; H, 6.44; F, 8.67. Found: C, 63.23; H, 6.82; F, 8.14.

PREPARATION 22

6α,9α - difluoro -11β,17α,21 - trihydroxy - 1,4 - pregnadiene - 3,20 - dione (1-dehydro-6α,9α - difluorohydrocortisone)

Nitrogen was bubbled through a solution of 1.4 grams of 6α,9α - difluoro - 11β,17α - dihydroxy - 21 - acetoxy-1,4 - pregnadiene - 3,20 - dione (1 - dehydro - 6α,9α - difluorohydrocortisone acetate) in 140 milliliters of methanol for fifteen minutes. To this was added a solution of 1.4 grams of potassium bicarbonate in 17.5 milliliters of water likewise treated with nitrogen. After stirring under nitrogen for five hours, the base was neutralized by the addition of 1.5 milliliters of acetic acid in forty milliliters of water. The mixture was then concentrated under reduced pressure at 55 degrees centigrade until crystallization started. The slurry was then cooled in an ice bath, diluted with 100 milliliters of water, and filtered to give 0.892 gram of 6α,9α-difluoro-11β,17α,21-trihydroxy - 1,4 - pregnadiene - 3,20 - dione (1 - dehydro-6α,9α-difluorohydrocortisone), melting point 232 to 242 degrees centigrade (with decomposition). An analytical sample melted at 250 to 257 degrees centigrade (with decomposition). An analytical sample melted at 250 to 257 degrees centigrade (with decomposition). Analysis gave $[\alpha]_D$ plus 84 degrees (acetone) and the following:

Analysis.—Calculated for $C_{21}H_{26}O_5F_2$: C, 63.62; H, 6.61; F, 9.59. Found: C, 62.26; H, 7.10; F, 9.41.

PREPARATION 23

6α,9α - difluoro - 11β,17α,21 - trihydroxy - 4 - pregnene-3,20-dione 21-methanesulfonate To a solution of 0.5 gram of 6α,9α-difluoro-11β,17α,21-trihydroxy-4-pregnene-3,20-dione in six milliliters of pyridine previously cooled to zero to five degrees centigrade was added 0.55 milliliter of methanesulfonyl chloride. The reaction mixture was stirred at six degrees centigrade for sixteen hours, and was then diluted with two milliliters of water and poured into 100 milliliters of cold five percent hydrochloric acid to precipitate the solid mesylate, 6α,9α-difluoro-11β,17α,21-trihydroxy-4-pregnene-3,20-dione 21-methanesulfonate. The product, after filtration, weighed 0.62 gram and was used without further purification.

PREPARATION 24

6α,9α - difluoro - 21 - iodo - 11β,17α - dihydroxy - 4 - pregnene-3,20-dione

To a solution of 0.65 gram of 6α,9α-difluoro-11β,17α,-21 - trihydroxy - 4-pregnene-3,20-dione 21-methanesulfonate in 65 milliliters of acetone was added a solution of 0.65 gram of sodium iodide in seven milliliters of acetone. The mixture was allowed to reflux on the steam bath for about ten minutes and was then concentrated to about ten milliliters and diluted with about 100 milliliters of water. The resulting solid 21-iodide was isolated by filtration after cooling for a short period at zero to five degrees centigrade. The yield was 0.57 gram of melting point 150 to 160 degrees centigrade (with decomposition).

PREPARATION 25

6α,9α,21 - trifluoro - 11β,17α - dihydroxy - 4 - pregnene - 3,20 - dione (6α,9α,21 - trifluoro - 21 - desoxyhydrocortisone)

To a solution of 0.57 gram of 6α,9α-difluoro-21-iodo-11β,17α - dihydroxy-4-pregnene-3,20-dione in 55 milliliters of acetonitrile at fifty to sixty degrees centigrade in the dark, was added 0.4 milliliter of fifty percent aqueous solution of silver fluoride. Addition was done in three equal portions at one-half hour intervals. After maintaining at this temperature for a total of one and one-half hours, the temperature was lowered to forty to fifty degrees centigrade for an additional two and one-half hours. The solvent was then removed under reduced pressure at fifty degrees centigrade and the black residue was digested with three fifty-milliliter portions of acetone. The product contained, in the acetone solution, was purified by chromatography over a column of synthetic magnesium silicate and crystallization from acetone-Skellysolve B hexanes to give 6α,9α,21-trifluoro-11β,17α-dihydroxy-4-pregnene-3,20-dione having a melting point of 210 to 235 degrees centigrade.

PREPARATION 26

6α,9α - difluoro - 11β,17α,21 - trihydroxy - 1,4 - pregnadiene-3,20-dione 21-methanesulfonate To a solution of 0.925 gram of 6α,9α-difluoro-11β,17α,-21 - trihydroxy - 1,4-pregnadiene-3,20-dione in ten milliliters of pyridine previously cooled to zero to five degrees centigrade was added 0.9 milliliter of methanesulfonyl chloride. The reaction mixture was stirred at zero to five degrees centigrade for seventeen hours, and was then poured into 100 milliliters of cold five percent hydrochloric acid to precipitate the solid mesylate. The product, after filtration, weighed 0.832 gram, and had a melting point of 157 degrees centigrade (with decomposition). This was used in the next step without further purification.

PREPARATION 27

6α,9α,21 - trifluoro - 11β,17α - dihydroxy - 1,4 - pregnadiene-3,20-dione (1-dehydro-6α,9α,21-trifluoro-21-desoxyhydrocortisone)

A mixture of 0.5 gram of 6α,9α-difluoro-11β,17α,21-trihydroxy - 1,4-pregnadiene-3,20-dione 21-methanesulfonate and 0.37 gram of potassium fluoride in ten milliliters of dimethylsulfoxide was stirred and heated on a steam bath for seventeen hours. The reaction mixture was then cooled, poured into 150 milliliters of water, and extracted with four 100-milliliter fractions of ethyl acetate. After drying over sodium sulfate, the ethyl acetate solution was evaporated to dryness and the residue (452 milligrams) was purified by chromatography over a column of synthetic magnesium silicate and crystallization from acetone-Skellysolve B hexanes to give 63 milligrams of crystals of 6α,9α,21-trifluoro-11β,17α-dihydroxy-1,4-pregnadiene-3,20-dione of melting point 267 to 272 degrees centigrade (with decomposition). An analytical sample recrystallized from ethyl acetate, melted at 273 to 277 degrees centigrade.

Analysis.—Calculated for $C_{21}H_{25}O_4F_3$: F, 14.31. Found: F, 13.06.

PREPARATION 28

*6α-fluoro-11β,17α,21-trihydroxy-4-pregnene-3,20-dione 21-methanesulfonate*

To a solution of 770 milligrams of crude 6α-fluoro-11β,17α,21-trihydroxy-4-pregnene-3,20-dione in ten milliliters of pyridine previously cooled to zero to five degrees centigrade was added 0.7 milliliter of methanesulfonyl chloride. The reaction mixture was stirred in an ice-water bath for four hours. Dilution with 100 milliliters of five percent hydrochloric acid precipitated the crystalline mesylate. The product, after filtration, weighed 900 milligrams and melted at 189 to 192 degrees (with decomposition). Infrared analysis in mineral oil mull showed absorptions as follows: 3560, 3420 centimeters$^{-1}$ (OH); 1725 centimeters$^{-1}$ (20-ketone); 1655 centimeters$^{-1}$ ($\Delta^4$-3-ketone); 1640, 1617 centimeters$^{-1}$ (C=C); 1350, 1200, 1170 centimeters$^{-1}$ (—OSO$_2$—).

PREPARATION 29

*6α,21-difluoro-11β,17α-dihydroxy-4-pregnene-3,20-dione (6α,21-difluoro-21-desoxyhydrocortisone)*

A mixture of 200 milligrams of 6α-fluoro-11β,17α,21-trihydroxy-4-pregnene-3,20-dione 21-methanesulfonate and 100 milligrams of potassium fluoride in two milliliters of dimethylsulfoxide was heated on a steam bath for seventeen hours. The reaction mixture was diluted with fifty milliliters of methylene chloride and washed three times with ten milliliters of water. After drying over sodium sulfate, the methylene chloride solution was passed over a column of ten grams of synthetic magnesium silicate. Elution with Skellysolve B hexanes plus nine percent acetone (four fractions of twenty milliliters each) gave 28 milligrams of crude crystals identified by infrared data as 6α-fluoro-11β-hydroxy-17,20-epoxy-4-pregnen-3-one. The infrared adsorption maximums in mineral oil mull were as follows: 3410 centimeters$^{-1}$ (OH); 1807 centimeters$^{-1}$ (C=O, 4-membered ring); 1660 centimeters$^{-1}$ ($\Delta^4$-3-keto); 1625 centimeters$^{-1}$ (C=C).

Further elution with Skellysolve B hexanes plus twelve and fifteen percent acetone yielded 45 milligrams of 6α,21-difluoro-11β,17α-dihydroxy-4-pregnene-3,20-dione which on recrystallization from ethyl acetate Skellysolve B gave 29 mgs. melting point 226 to 230 degrees centigrade. Infrared adsorption showed the following maximums: 3600, 3540, 3360 centimeters$^{-1}$ (OH); 1722 centimeters$^{-1}$ (20-ketone); 1653 centimeters$^{-1}$ ($\Delta^4$-3-ketone); 1625 centimeters$^{-1}$ (C=C).

PREPARATION 30

*6α-fluoro-11β,17α,21-trihydroxy-1,4-pregnadiene-3,20-dione 21-methanesulfonate*

Three hundred milligrams of 6α-fluoro-11β,17α,21-trihydroxy-1,4-pregnadiene-3,20-dione was dissolved in pyridine and cooled to a temperature of between zero and five degrees centigrade. 0.1 milliliter of methanesulfonyl chloride was added and the solution maintained between zero and five degrees centigrade for two hours. This was poured into a solution of three milliliters of concentrated hydrochloric acid diluted with fifty milliliters of water. 310 milligrams of crystalline 6α-fluoro-11β,17α,21-trihydroxy-1,4-pregnadiene-3,20-dione 21-methanesulfonate was precipitated from the diluted hydrochloric acid. The product melted with decomposition at 200 to 202 degrees centigrade. Infrared adsorption, in a mineral oil mull were as follows: 3570, 3370 centimeters$^{-1}$ (OH), 1727 centimeters$^{-1}$ (20-ketone); 1665 centimeters$^{-1}$, (conjugated ketone); 1623, 1601 centimeters$^{-1}$ ($\Delta^{1,4}$); 1360, 1342; 1172 centimeters$^{-1}$ (O—SO$_2$).

PREPARATION 31

*6α,21-difluoro-11β,17α-dihydroxy-1,4-pregnadiene-3,20-dione*

A mixture of 100 milligrams of 6α-fluoro-11β,17α,21-trihydroxy-1,4-pregnadiene-3,20-dione 21-methanesulfonate and fifty milligrams of potassium fluoride in one milliliter of dimethylsulfoxide was refluxed on a steam bath for eighteen hours. The mixture was diluted with fifty milliliters of methylene dichloride and washed two times with ten milliliters of water. The methylene chloride solution was passed over a column of twenty grams of Florosil (synthetic magnesium silicate). Elution with a mixture composed of 91 parts of Skellysolve B (hexane hydrocarbons) and 9 parts of acetone gave a fraction of fourteen milligrams. The infrared absorption of this compound indicated it was 6α-fluoro-11β-hydroxy-17α,21-oxido-1,4-pregnadiene-3,20-dione. The absorptions in mineral oil mull were as follows: 3380 centimeters$^{-1}$ (OH); 1807 centimeters$^{-1}$ (four membered ring).

The fraction containing the principal product was eluted with a mixture composed of Skellysolve B and twelve to fifteen percent of acetone. The product weighed 28 milligrams and after recrystallization from a mixture of ethyl acetate and Skellysolve B yielded sixteen milligrams. The melting point of the purified 6α,21-difluoro-11β,17α-dihydroxy-1,4-pregnadiene-3,20-dione was 226 to 231 degrees centigrade. Infrared absorptions in mineral oil mull follow: 3360 centimeters$^{-1}$ (OH); 1725 centimeters$^{-1}$ (ketone); 1655 centimeters$^{-1}$ (conjugated ketone); 1597 centimeters$^{-1}$ ($\Delta^{1,4}$).

EXAMPLE 1

*6α,21-difluoro-11β,16α,17α-trihydroxy-4-pregnene-3,20-dione*

One hundred milliliters of two percent corn steep liquor of sixty percent solids was adjusted to pH of 6.8 to 7.4 with sodium hydroxide and was sterilized at fifteen pounds pressure for thirty minutes. To this was added a similarly sterile solution of two grams of Cerelose (technical grade of dextrose) in four milliliters of water. This sterile medium was inoculated with a suspension of spores and mycelium of *Streptomyces roseochromogenus* (Waksman Collection No. 3689) and was agitated on a rotatory shaker for a period of 24 hours by which time a good growth of the organism had taken place. To this 24 hour culture, twenty milligrams of 6α,21-difluoro-11β,17α-dihydroxy-4-pregnene-3,20-dione dissolved in 0.2 milliliter of dimethylformamide was added. Incubation of the steroid with the microorganism was maintained (with agitation) for five days, at which time the pH was 8.6. The fermentation broth was then separated into the mycelium and the beer by centrifugation. The mycelium was extracted first with two 25 milliliter portions of acetone and then with four successive 25 milliliter portions of methyl isopropyl ketone. The beer was extracted with four successive 25 milliliter portions of methyl isopropyl ketone. All of the extracts were combined, washed with two percent aqueous sodium bicarbonate solution and with water, dried with anhydrous sodium sulfate, and evaporated to dryness. The residue, which on paper chromatogram analysis showed the presence of 6α,21-difluoro-11β,16α,17α-trihydroxy-4-pregnene-3,20-dione, was purified by chromatography over synthetic magnesium silicate (Florisil) and crystallization from acetone to give 6α,21-difluoro-11β,16α,17α-trihydroxy-4-pregnene-3,20-dione.

Following the procedure of Example 1 above, but substituting 6α,9α,21-trifluoro-11β,17α-dihydroxy-4-pregnene-3,20-dione, 6α,21-difluoro-11β,17α-dihydroxy-1,4-pregnadiene-3,20-dione, or 6α,9α,21-trifluoro-11β,17α-dihydroxy-1,4-pregnadiene-3,20-dione as starting material therein, is productive of 6α,9α,21-trifluoro-11β,16α,17α-trihydroxy-4-pregnene-3,20-dione, 6α,21-difluoro-11β,16α,17α-trihydroxy-1,4-pregnadiene-3,20-dione, and 6α,9α,21-trifluoro-11β,16α,17α - trihydroxy - 1,4 - pregnadiene - 3,20 - dione, respectively.

EXAMPLE 2

*6α,21-difluoro-11β,16α,17α-trihydroxy-4-pregnene-3,20-dione 16-acetate*

A solution of 1.2 grams of 6α,21-difluoro-11β,16α,17α-trihydroxy-4-pregnene-3,20-dione (from Example 1) in twenty milliliters of pyridine and twenty milliliters of acetic anhydride was allowed to stand at room temperature (about 25 degrees centigrade) for eighteen hours and was then poured into 200 milliliters of ice-water. The resulting mixture was extracted with methylene chloride and the extract was washed with dilute hydrochloric acid, dilute sodium bicarbonate and water. After drying the solution with anhydrous sodium sulfate, the solvent was removed by evaporation and the residue was purified by chromatography over synthetic magnesium silicate (Florisil) and crystallization from acetone to give 6α,21-difluoro-11β,16α,17α-trihydroxy-4-pregnene-3,20-dione 16-acetate.

Following the procedure of Example 2 above but substituting 6α,9α,21-trifluoro-11β,16α,17α-trihydroxy-4-pregnene-3,20-dione, 6α,21-difluoro-11β,16α,17α-trihydroxy-1,4-pregnadiene-3,20-dione, or 6α,9α,21-trifluoro-11β,16α,17α - trihydroxy - 1,4 - pregnadiene - 3,20 - dione as starting material therein is productive of 6α,9α,21-trifluoro-11β,16α,17α - trihydroxy - 4 - pregnene - 3,20 - dione 16-acetate, 6α,21-difluoro - 11β,16α,17α - trihydroxy - 1,4-pregnadiene-3,20-dione 16-acetate and 6α,9α,21-trifluoro-11β,16α,17α - trihydroxy - 1,4 - pregnadiene - 3,20 - dione 16-acetate, respectively.

Similarly, acylation of 6α,21-difluoro-11β,16α,17α-trihydroxy-4-pregnene-3,20-dione with the appropriate acid anhydride or acid chloride is productive of still other 16-acylates such as, for example, 6α,21-difluoro-11β,16α,17α-trihydroxy-4-pregnene-3,20-dione 16-propionate, 6α,21 - difluoro - 11β,16α,17α - trihydroxy - 4 - pregnene-3,20-dione 16-butyrate, 6α,21-difluoro-11β,16α,17α-trihydroxy-4-pregnene-3,20-dione 16-valerate, 6α,21-difluoro-11β,16α,17α-trihydroxy-4-pregnene-3,20-dione 16-hexanoate, 6α,21-difluoro-11β,16α,17α-trihydroxy-4-pregnene-3,20-dione 16-laurate, 6α,21-difluoro-11β,16α,17α-trihydroxy-4-pregnene-3,20-dione 16-trimethylacetate, 6α,21-difluoro-11β,16α,17α-trihydroxy-4-pregnene-3,20-dione 16-isobutyrate, 6α,21-difluoro-11β,16α,17α-trihydroxy-4-pregnene-3,20-dione 16-isovalerate, 16α,21-difluoro-11β,16α,17α-trihydroxy-4-pregnen-3,20-dione 6-cyclohexane carboxylate, 6α,21-difluoro-11β,16α,17α-trihydroxy-4-pregnene-3,20-dione 16-benzoate, 6α,21-difluoro-11β,16α,17α-trihydroxy-4-pregnene-3,20-dione 16-phenylacetate, 6α,21 - difluoro - 11β,16α,17α - trihydroxy - 4 - pregnene-3,20-dione 16-(β-phenyl)-propionate, 6α,21-difluoro-11β,16α,17α-trihydroxy-4-pregnene-3,20-dione 16-(o-, m-) p-toluate, 6α,21 - difluoro - 11β,16α,17α - trihydroxy - 4 - pregnene-3,20-dione 16-hemisuccinate, 6α,21-difluoro-11β,16α,17α - trihydroxy-4-pregnene-3,20-dione 16-hemiadipate, 6α,21 - difluoro - 11β,16α,17α - trihydroxy - 4 - pregnene-3,20-dione 16-acrylate, 6α,21-difluoro-11β,16α,17α - trihydroxy - 4 - pregnene - 3,20 - dione 16 - undecylenate, 6α,21 - difluoro - 11β,16α,17α - trihydroxy - 4 - pregnene-3,20-dione 16-propiolate, 6α,21-difluoro-11β,16α,17α-trihydroxy-4-pregnene-3,20-dione 16-cinnamate, 6α,21 - fluoro - 11β,16α,17α - trihydroxy - 4 - pregnene-3,20-dione 16-maleate, 6α,21-difluoro-11β,17α-trihydroxy-4-pregnene-3,20-dione 16-citraconate.

Similarly, acylation of 6α,9α,21-trifluoro-11β,16α,17α-trihydroxy-4-pregnene-3,20-dione, 6α,21-difluoro-11β,16α,17α-trihydroxy-1,4-pregnadiene-3,20-dione or 6α,9α,21-trifluoro - 11β,16α,17α - trihydroxy - 1,4 - pregnadiene-3,20-dione with the appropriate acylating agent is productive of the corresponding 16-acylates. The preferred acylates are those corresponding to the acylates described above for 6α,21-difluoro-11β,16α,17α-trihydroxy-4-pregnene-3,20-dione.

EXAMPLE 3

*6α,21-difluoro-16α,17α-dihydroxy-4-pregnene-3,11,20-trione 16-acetate*

To a solution of 0.5 gram of 6α,21-difluoro-11β,16α,17α-trihydroxy-4-pregnene-3,20-dione 16-acetate in twenty milliliters of acetic acid was added a solution of 0.15 gram of chromium trioxide in one-half milliliter of water. The mixture was stirred and maintained at room temperature (about 25 degrees centigrade) for a period of four hours. Thereafter, the excess oxidant was destroyed by the addition of 0.5 milliliter of methanol and the mixture was poured into 100 milliliters of water and extracted with methylene chloride. The extract was washed with dilute sodium bicarbonate and with water, and was dried and evaporated to dryness. The residue was crystallized from acetone to give 6α,21-difluoro-16α,17α-dihydroxy-4-pregnene-3,11,20-trione 16-acetate.

Following the procedure of Example 3 above but substituting 6α,9α,21-trifluoro-11β,16α,17α-trihydroxy-4-pregnene-3,20-dione 16-acetate, 6α,21-difluoro-11β,16α,17α-trihydroxy-1,4-pregnadiene-3,20-dione 16-acetate, 6α,9α,21-trifluoro-11β,16α,17α-trihydroxy-1,4-pregnadiene-3,20-dione 16-acetate, or 6α,9α,21-trifluoro-11β,16α,17α-trihydroxy-1,4-pregnadiene-3,20-dione 16-acetate as starting material therein is productive of 6α,9α,21-trifluoro-16α,17α-dihydroxy-4-pregnene-3,11,20-trione 16-acetate, 6α,21 - difluoro - 16α,17α - dihydroxy - 1,4 - pregnadiene-3,11,20-trione 16-acetate, and 6α,9α,21-trifluoro-16α,17α-dihydroxy-1,4-pregnadiene-3,11,20-trione 16-acetate, respectively.

Similarly oxidation of other 11β-hydroxy 16-ester compounds of Example 2 is productive of the corresponding 11-keto 16-ester compounds. The preferred 11-keto 16-ester compounds are those wherein the acyl radical is that of an organic carboxylic acid, preferably a hydrocarbon carboxylic acid containing from one to twelve carbon atoms, inclusive.

EXAMPLE 4

*6α,21-difluoro-16α,17α-dihydroxy-4-pregnene-3,11,20-trione*

A solution of 1.2 grams of 6α,21-difluoro-16α,17α-dihydroxy-4-pregnene-3,11,20-trione 16-acetate, two grams of potassium bicarbonate, 100 milliliters of methanol and fifteen milliliters of water was purged with nitrogen and stirred at 25 degrees centigrade for eight hours. The solution was then neutralized by addition of acetic acid and the methanol was removed by distillation under reduced pressure. The residue was extracted with 100 milliliters of methylene chloride and the extract, after drying over sodium sulfate, was chromatographed over a column of eighty grams of synthetic magnesium silicate using Skellysolve B with increasing amounts of acetone for elution. The product fraction from the column was crystallized from acetone to give 6α,21-difluoro-16α,17α-dihydroxy-4-pregnene-3,11,20-trione.

Following the procedure of Example 4, saponification of 6α,9α,21 - trifluoro - 16α,17α - dihydroxy - 4 - pregnene-3,11,20-trione 16-acetate, 6α,21-difluoro-16α,17α-dihydroxy-1,4-pregnadiene-3,11,20-trione 16-acetate and 6α,9α,21-trifluoro-16α,17α-dihydroxy-1,4-pregnadiene - 3,11,20-trione 16-acetate of Example 3 is productive of the corresponding hydroxy compounds, 6α,9α,21-trifluoro-16α,17α-dihydroxy-4-pregnene-3,11,20-trione, 6α,21-dihydroxy-1,4-pregnadiene-3,11,20-trione, and 6α,9α,21-trifluoro-16α,17α-dihydroxy-1,4-pregnadiene-3,11,20-trione.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A 16-oxygenated steroid of the formula:

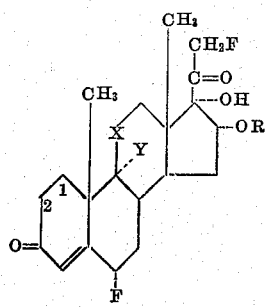

wherein the 1,2-carbon atom linkage is selected from the linkages consisting of single bond and double bond linkages, Y is selected from the group consisting of hydrogen and fluorine, X is selected from the group consisting of the carbonyl radical and the β-hydroxymethylene radical, and R is selected from the group consisting of hydrogen and the acyl radical of a hydrocarbon carboxylic acid containing from one to twelve carbon atoms, inclusive.

2. A 16-oxygenated pregnene of the formula:

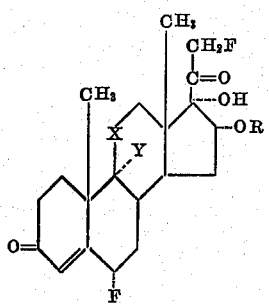

wherein Y is selected from the group consisting of hydrogen and fluorine, X is selected from the group consisting of the carbonyl radical and the β-hydroxymethylene radical, and R is selected from the group consisting of hydrogen and the acyl radical of a hydrocarbon carboxylic acid containing from one to twelve carbon atoms, inclusive.

3. 6α,21-difluoro-11β,16α,17α-trihydroxy-4-pregnene-3,20-dione.

4. 6α,9α,21 - trifluoro - 11β,16α,17α - trihydroxy - 4-pregnene-3,20-dione.

5. 6α,21 - difluoro - 16α,17α - dihydroxy - 4 - pregnene-3,11,20-trione.

6. 6α,9α,21 - trifluoro - 16α,17α - dihydroxy - 4 - pregnene-3,11,20-trione.

7. 6α,21 - difluoro - 11β,16α,17α - trihydroxy - 4 - pregnene-3,20-dione 16-acetate.

8. 6α,9α,21 - trifluoro - 11β,16α,17α - trihydroxy - 4-pregnene-3,20-dione 16-acetate.

9. 6α,21 - difluoro - 16α,17α - dihydroxy - 4 - pregnene-3,11,20-trione 16-acetate.

10. 6α,9α,21-trifluoro-16α,17α-dihydroxy-4-pregnene-3,11,20-trione 16-acetate.

11. A 16-oxygenated pregnadiene of the formula:

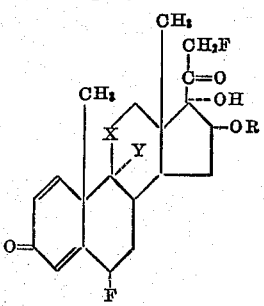

wherein Y is selected from the group consisting of hydrogen and fluorine, X is selected from the group consisting of the carbonyl radical and the β-hydroxymethylene radical, and R is selected from the group consisting of hydrogen and the acyl radical of a hydrocarbon carboxylic acid containing from one to twelve carbon atoms, inclusive.

12. 6α,21 - difluoro - 11β,16α,17α - trihydroxy - 1,4-pregnadiene-3,20-dione.

13. 6α,9α,21 - trifluoro - 11β,16α,17α - trihydroxy - 1,4-pregnadine-3,20-dione.

14. 6α,21 - difluoro - 16α,17α - dihydroxy - 1,4 - pregnadiene-3,11,20-trione.

15. 6α,9α,21 - trifluoro - 16α,17α - dihydroxy - 1,4-pregnadiene-3,11,20-trione.

16. 6α,21 - difluoro - 11β,16α,17α - trihydroxy - 1,4-pregnadine-3,20-dione 16-acetate.

17. 6α,9α,21 - trifluoro - 11β,16α,17α - trihydroxy - 1,4-pregnadiene-3,20-dione 16-acetate.

18. 6α,21 - difluoro - 16α,17α - dihydroxy - 1,4 - pregnadiene-3,11,20-trione 16-acetate.

19. 6α,9α,21 - trifluoro - 16α,17α - dihydroxy - 1,4-pregnadiene-3,11,20-trione 16-acetate.

No references cited.

UNITED STATES PATENT OFFICE
CERTIFICATE OF CORRECTION

Patent No. 2,838,547                             June 10, 1958

Barney J. Magerlein et al.

It is hereby certified that error appears in the printed specification of the above numbered patent requiring correction and that the said Letters Patent should read as corrected below.

Column 1, line 71, for "-30,20-dione" read -- -3,20-dione --; column 2, line 35, for "July 8, 952" read --July 8, 1952--; column 6, line 15, for "tetiary" read --tertiary--; column 15, line 50, for "16$\alpha$,21-" read -- 6$\alpha$,21- --; line 51, for "6-cyclohexane" read --16-cyclohexane--.

Signed and sealed this 14th day of October 1958.

(SEAL)
Attest:

KARL H. AXLINE                                                             ROBERT C. WATSON
Attesting Officer                                            Commissioner of Patents